(12) United States Patent
Stamatakis et al.

(10) Patent No.: US 7,571,739 B2
(45) Date of Patent: Aug. 11, 2009

(54) CONDENSATE REMOVAL DEVICE

(75) Inventors: E. Michael Stamatakis, St. Louis, MO (US); Michael C. Stamatakis, St. Louis, MO (US); Christopher T. Luppens, St. Louis, MO (US)

(73) Assignee: Steam Tech, Inc., St. Louis, MO (US)

( * ) Notice: Subject to any disclaimer, the term of this patent is extended or adjusted under 35 U.S.C. 154(b) by 114 days.

(21) Appl. No.: 11/303,706

(22) Filed: Dec. 16, 2005

(65) Prior Publication Data

US 2007/0137706 A1 Jun. 21, 2007

(51) Int. Cl.
*F16T 1/20* (2006.01)

(52) U.S. Cl. ........................................ 137/192; 137/429

(58) Field of Classification Search ................ 137/187, 137/179–180, 192, 177, 183, 429, 434
See application file for complete search history.

(56) References Cited

U.S. PATENT DOCUMENTS

| | | | | | |
|---|---|---|---|---|---|
| 824,554 | A | * | 6/1906 | Lindstrom | 137/192 |
| 1,448,972 | A | * | 3/1923 | Long | 137/192 |
| 2,051,732 | A | * | 8/1936 | McKee | 137/2 |
| 2,146,731 | A | | 2/1939 | Goodale | |
| 2,258,450 | A | * | 10/1941 | Graham | 137/154 |
| 2,292,509 | A | * | 8/1942 | Carson | 137/173 |
| 2,489,461 | A | * | 11/1949 | Parrish | 137/174 |
| 2,790,457 | A | * | 4/1957 | Millerwise | 137/316 |
| 2,945,505 | A | | 7/1960 | Hansen et al. | |
| 3,489,164 | A | | 1/1970 | Fujiwara | |
| 4,313,897 | A | * | 2/1982 | Garrard | 261/64.5 |
| 4,708,157 | A | * | 11/1987 | Sabatino | 137/179 |
| 5,088,518 | A | | 2/1992 | Stamatakis et al. | |
| 5,186,203 | A | | 2/1993 | Oike | |
| 5,287,878 | A | | 2/1994 | Oike | |
| 5,398,716 | A | * | 3/1995 | Hsu | 137/195 |
| 5,421,360 | A | * | 6/1995 | Castaneda et al. | 137/192 |
| 5,564,459 | A | * | 10/1996 | Dunne | 137/181 |
| 5,833,135 | A | | 11/1998 | Yumoto | |
| 5,884,654 | A | | 3/1999 | Oike | |

(Continued)

OTHER PUBLICATIONS

International Search Report, Feb. 22, 2008, 3 pgs., Alexandria, Virginia, United States.

*Primary Examiner*—Stephen M Hepperle
*Assistant Examiner*—Craig M Schneider
(74) *Attorney, Agent, or Firm*—Senniger Powers LLP

(57) ABSTRACT

A condensate drain includes a body defining an interior space. An inlet opening is in fluid communication with the interior space of the body for allowing condensate to enter into the interior space, and an outlet opening is in fluid communication with the interior space of the body for allowing condensate to exit the interior space. A float is disposed in the interior space for movement within the interior space relative to the body generally along a float axis between a closed position in which the float blocks fluid communication from the inlet opening to the outlet opening and an open position in which the float permits fluid communication from the inlet opening to the outlet opening. The float is buoyant so that the float is moved to the open position by condensate as condensate fills the interior space of the body. The interior space and the float are sized and shaped so that the float is constrained to substantial alignment with the float axis.

12 Claims, 15 Drawing Sheets

U.S. PATENT DOCUMENTS

| | | |
|---|---|---|
| 5,934,881 A | 8/1999 | Yumoto |
| 6,131,602 A | 10/2000 | Oike |
| 6,148,844 A | 11/2000 | Stamatakis |
| 6,287,370 B1 * | 9/2001 | Kanazawa .................. 96/409 |
| 2003/0098061 A1 * | 5/2003 | Stuchlik, III ................ 137/192 |
| 2004/0182945 A1 * | 9/2004 | Kemper et al. .............. 237/8 R |

* cited by examiner

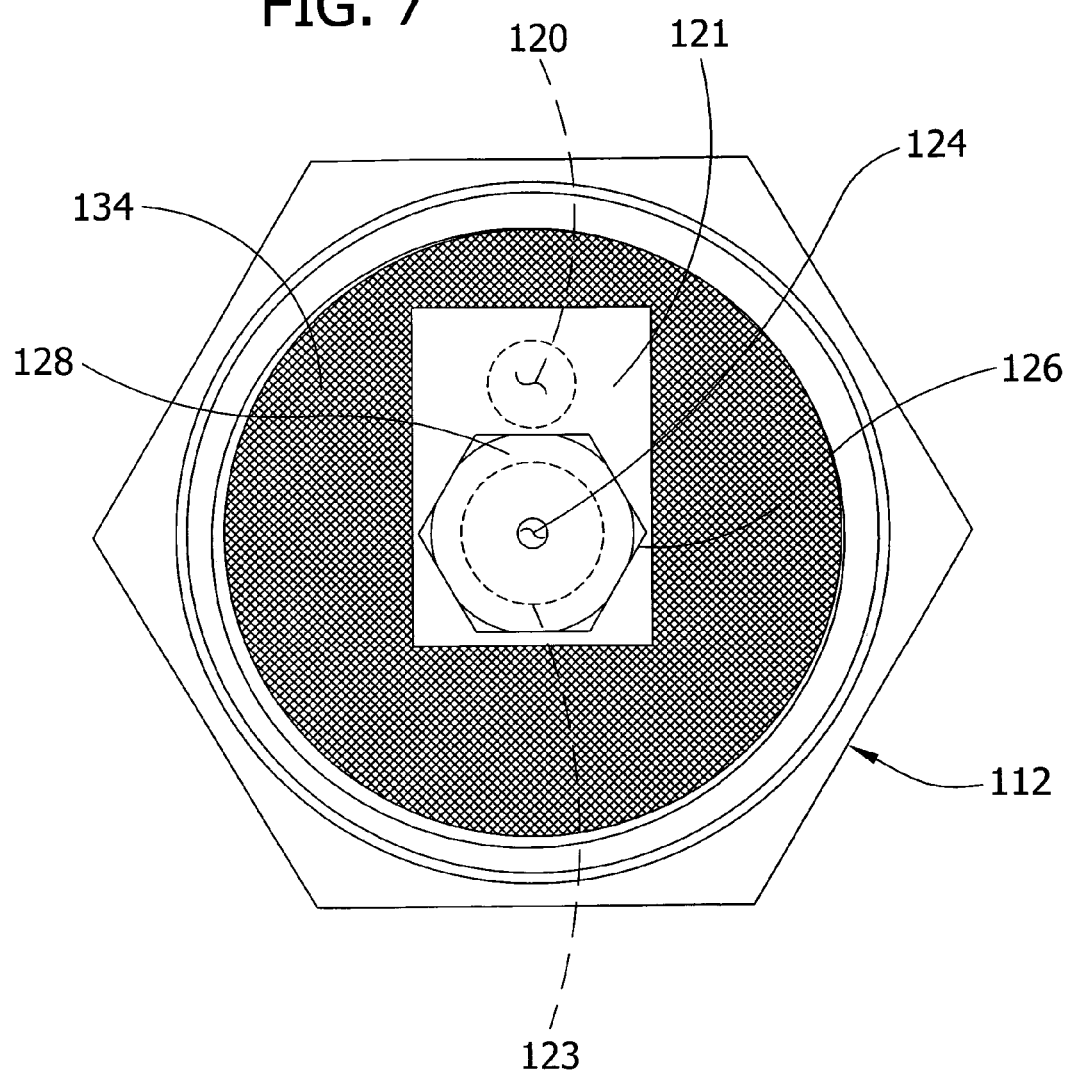

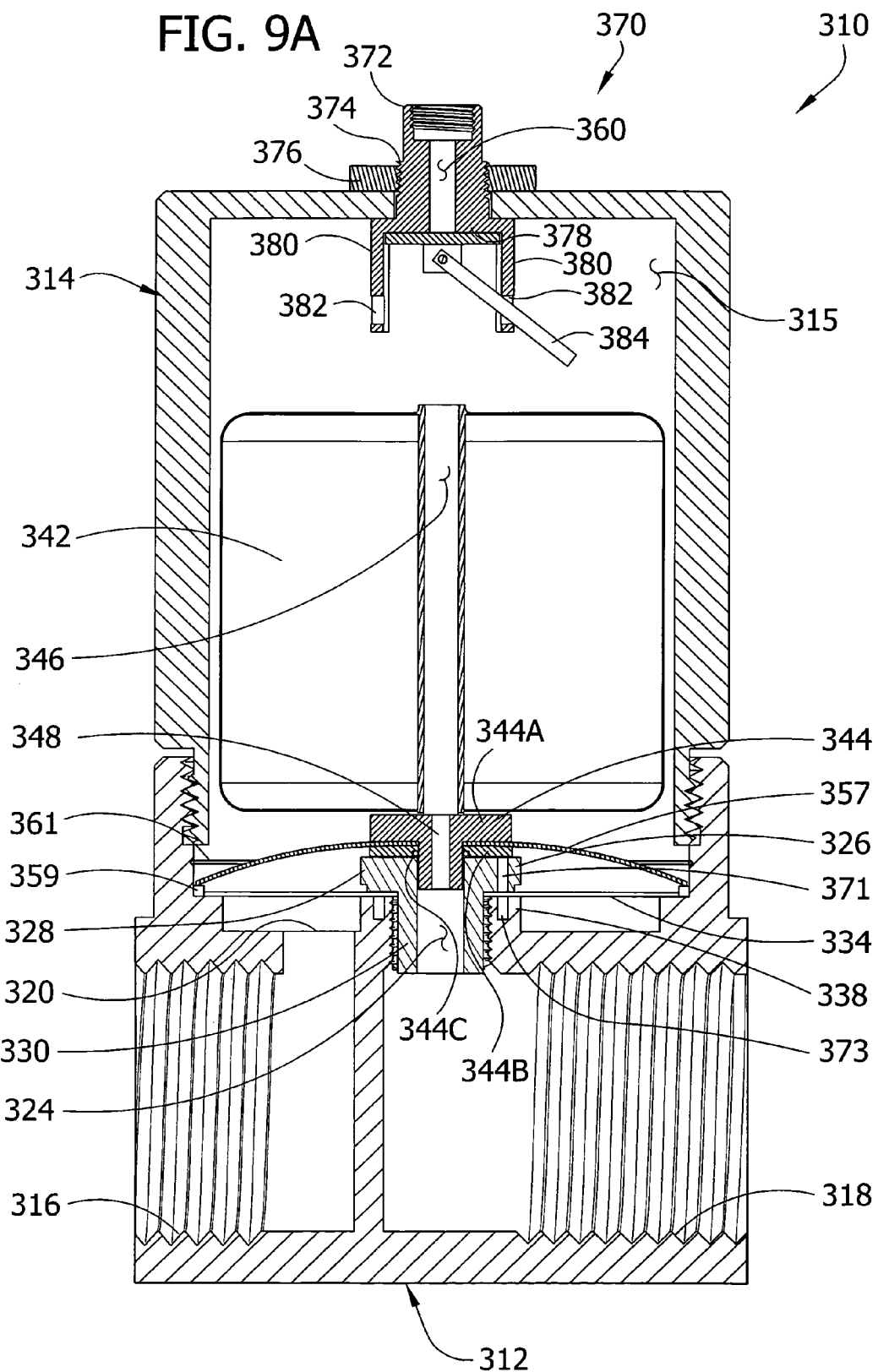

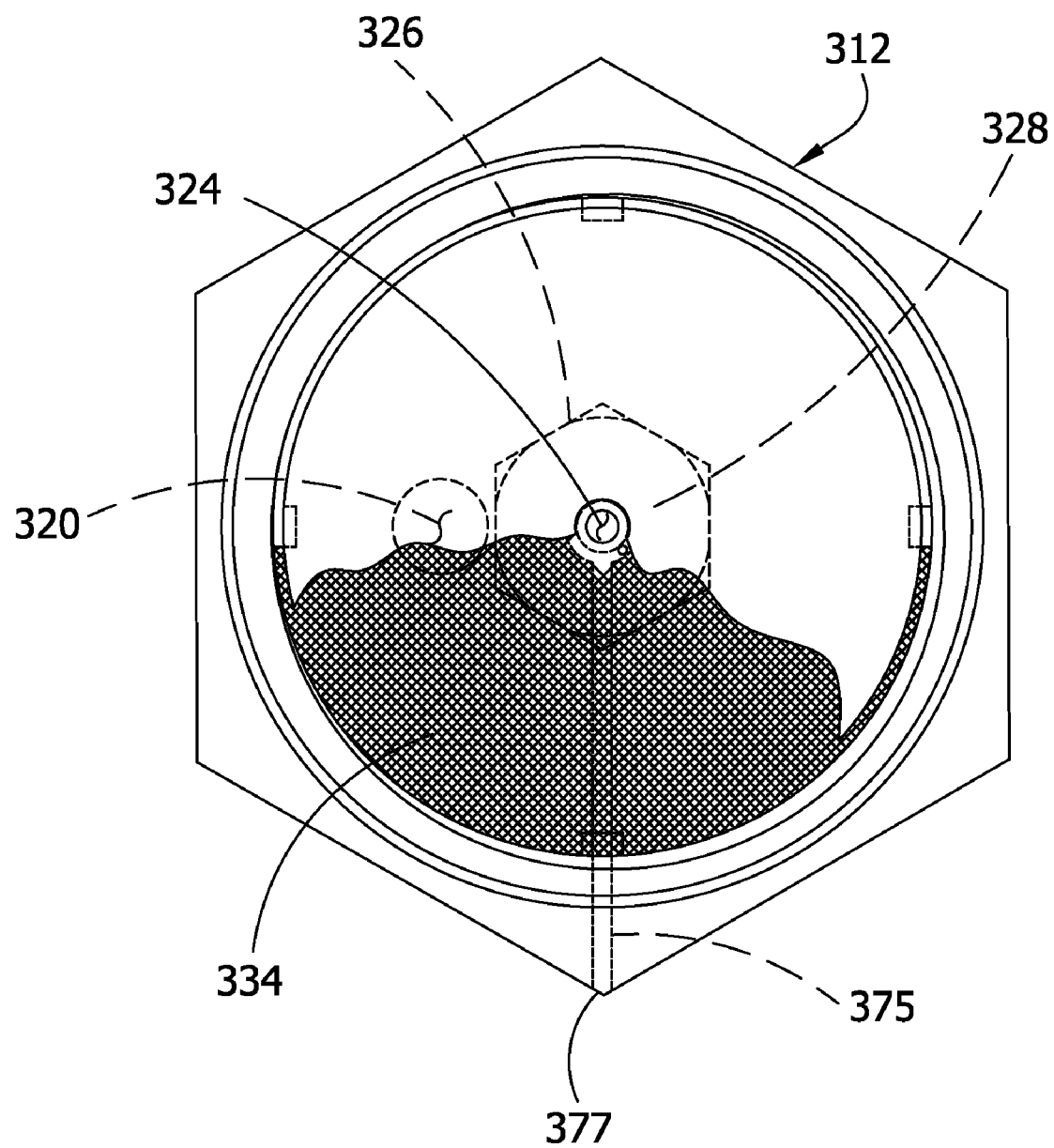

CONDENSATE REMOVAL DEVICE

BACKGROUND OF THE INVENTION

The present invention generally relates to condensate removal devices in piping systems, and more particularly to a float type condensate drain.

Steam is an efficient and widely used heat transfer medium for transporting energy. An unavoidable by-product when using steam is liquid condensate (i.e., water) that forms when heat is transferred away from steam along pipes or at heat exchangers. Basically, when the steam cools below a threshold temperature at a given pressure it becomes condensate. As a result, condensate collects inside pipes or other components, which significantly degrades system efficiency. In addition, condensate can cause a destructive water hammer, a shock wave that damages components and can cause serious injury to people nearby. Accordingly, condensate should be removed from steam systems as it forms.

A steam trap is a mechanical device used to drain condensate while retaining or "trapping" steam. Traps are typically positioned at natural low points in steam systems where condensate collects or ahead of control valves where condensate could impede proper valve operation. Most traps operate using the inherent difference in density between liquid and gas to separate the fluids. Ideally, each trap should be capable of draining a mass flow, or load, of condensate that flows to its location in the steam system. Each trap should also be reliable in operation to avoid costly inefficiencies that arise when condensate collects or when live steam is released from a defective trap. Several types of steam traps are commonly available. Some are complex in design and subject to fail without frequent maintenance.

One type of trap that is economical and reliable is a fixed orifice trap. A relatively small hole or a tubular passageway in a trap permits condensate to drain through. These traps are comparatively inexpensive and there are no moving parts to corrode or fail. They are very effective in draining condensate while preventing release of live steam. The condensate flowing in a fixed orifice generally blocks entry of steam.

A drawback to fixed orifice traps is that they cannot accept large variation in condensate load. The diameter of the orifice is fixed, and therefore the capacity of the trap, which is proportional to area of the orifice and the flow velocity, is also substantially fixed. Thus, the orifice in the trap is sized to drain an expected load. The actual load, however, can increase by a factor of four or more if ambient temperature decreases, causing heat transfer rates from the steam to increase and causing formation of a larger quantity of condensate. In the past, this has been partially compensated for by over-sizing the orifice for the particular application.

An over-sized orifice not only passes more load, but possesses a valuable secondary benefit of a greater ability to pass solid debris. Small deposits of corrosion or other particulate matter within the steam system may become mixed with the condensate and can clog the trap. Solid particles are less likely to lodge in an orifice or passageway that is relatively larger. However, a trap having an orifice that is larger than needed for ordinary loads tends to permit release of live steam and, as a result, is inefficient.

A second type of trap is a thermodynamic or disk type trap. An obstruction comprising a flat disk is freely captured in the trap and is movable between a closed position in which the disk blocks flow of fluid through the trap, and an open position in which the disk permits flow of fluid. The disk may cycle between open and closed positions, and when in the open position the trap is capable of handling a greater quantity of condensate load than a fixed orifice trap. Condensate flow initially raises the disk open as it flows in. When steam arrives it changes the local pressure and lowers the disk, closing the trap, which stays closed as long as relatively higher pressure is maintained above the disk. At each cycle, there is an inherent time delay for closing the disk, as is common in thermodynamic traps, during which some live steam is released from the trap. So although the thermodynamic trap is beneficial in draining a large quantity of load, it has inherent inefficiency.

Another type of steam trap is a float type trap. In this type of trap, a float is disposed within an interior space of the trap for engaging and blocking an outlet port. As condensate builds up in the steam system, it collects in the interior space of the trap causing the float, which is buoyant, to lift off of the outlet port and allow condensate to flow out of the interior space of the trap through the outlet port. Once a sufficient amount of condensate has drained from the interior space of the trap, the float reengages and blocks the outlet port. The float moves in and out of engage with the outlet port, as necessary, to allow collected condensate to drain from the interior space of the trap while preventing the exit of steam. The float is typically spherical and is free to move within the trap. Under certain transient conditions, the float can be violently moved within the trap, slamming into the walls and outlet port. Although, the ball is made of metal, it becomes heavily dented over time. The damaged float is less capable of making a seal with the outlet port, thereby greatly reducing its effectiveness, or rendering the float inoperable to close the outlet port.

Operating conditions, including pressure, temperature, condensate load, and amount of solid debris vary not only from one system to another but also from one region of a system to other regions in the same system. Accordingly, different types of traps may be more appropriate for placement in certain areas of the steam system. Unfortunately, knowledge of operating conditions is uncertain, not easily predicted, and varies over time. Since typical stream traps are best suited for operating over only a small range of conditions, it is often not clear which type of trap is best suited for a given steam system or in a particular region of system. In practice, many steam system operators maintain a large and cumbersome inventory of several types of steam traps, and they choose one trap appropriate to estimated flow conditions. Operators may need to change steam traps because of altered or mistakenly estimated conditions. When an installed trap is removed and replaced, it often requires breaking a steam line, resulting in substantial downtime for the entire steam system. Moreover, maintaining an inventory of various types of traps that may or may not be used is expensive.

SUMMARY OF THE INVENTION

In one aspect, the present invention is directed to a condensate drain generally comprising a body defining an interior space. An inlet opening is in fluid communication with the interior space of the body for allowing condensate to enter into the interior space, and an outlet opening is in fluid communication with the interior space of the body for allowing condensate to exit the interior space. A float is disposed in the interior space for movement within the interior space relative to the body generally along a float axis between a closed position in which the float blocks fluid communication from the inlet opening to the outlet opening and an open position in which the float permits fluid communication from the inlet opening to the outlet opening. The float is buoyant so that the float is moved to the open position by condensate as condensate fills the interior space of the body. The body interior space and the float are sized and shaped so that the float is constrained to substantial alignment with the float axis.

In another aspect, the present invention is directed to a modular condensate drain generally comprising a body including a base adapted for connection to a steam piping system. A cap is cooperable with the base to define an interior space. An inlet opening is in fluid communication with the interior space of the body for allowing condensate from the piping system to enter into the interior space. A seat defines an outlet opening in fluid communication with the interior space of the body for allowing condensate to exit the interior space. A float is disposed in the interior space for movement within the interior space relative to the body between a closed position in which the float engages the seat and blocks fluid communication from the inlet opening to the outlet opening and an open position in which the float permits fluid communication from the inlet opening to the outlet opening. The float is buoyant so that the float is moved to the open position by condensate as condensate fills the interior space of the body. The cap is constructed for removable attachment to the base and the seat is constructed for removable attachment to the body for selective replacement of the seat.

Other objects and features will be in part apparent and in part pointed out hereinafter.

BRIEF DESCRIPTION OF THE DRAWINGS

FIG. 7 is a top plan view of a base of the drain showing a baffle;

FIG. 9A is a perspective of a condensate drain having still another configuration;

FIG. 10 is a top plan view of a base shown in FIG. 9 with a portion of a bimetallic disk broken away to show a failure warning system.

Corresponding reference characters indicate corresponding parts throughout the drawings.

DETAILED DESCRIPTION OF THE INVENTION

Figure 1:
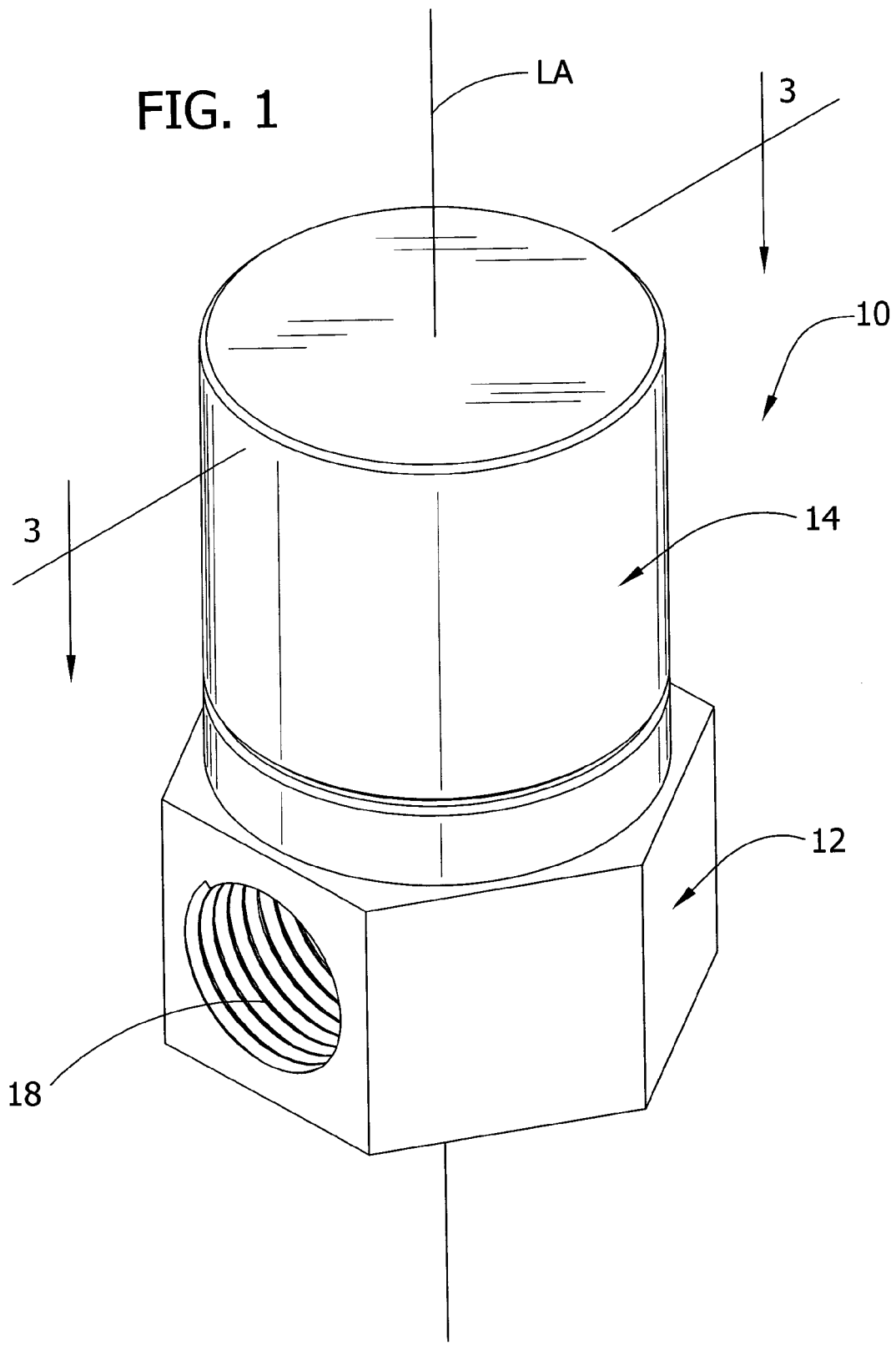
FIG. 1 is a perspective of a condensate drain of the present invention.

Referring now to the drawings and in particular to FIG. 1, a condensate drain is indicated generally at 10. The drain 10 can be used to effectively remove condensate from a variety of gas and liquid fluid systems, in which condensate collects. For example and as described herein, the drain 10 can be used in a steam system (not shown) as a steam trap. That is, the drain 10 is design to allow condensate to pass through the drain so that it can be removed from the steam system while preventing steam from exiting the system.

A necessary consequence of operating a steam system is the production of condensate. While the quantity of condensate, produced in some systems or regions of a single system may be somewhat consistent, often times there are large variations in the quantity of condensate produced over time. For example, a drop in ambient temperature may result in a larger quantity of condensate being produced whereas a rise in ambient temperature may result in a smaller quantity of condensate being produced. Moreover, large quantities of condensate and air may be present during the startup of the steam system after a period of down time.

The drain 10 is modular so that it can be configured to handle large quantities of condensate, small quantities of condensate, or fluctuating quantities of condensate. Thus, the drain 10 of the present invention can be easily configured as described below to accommodate many types of condensate conditions. Moreover, the modular components of the drain 10 can be nondestructively removed, installed, or replaced while the drain is connected to the steam system. The steam system piping does not need to be disassembled in anyway to change the configuration of the modular drain 10.

Figure 2:
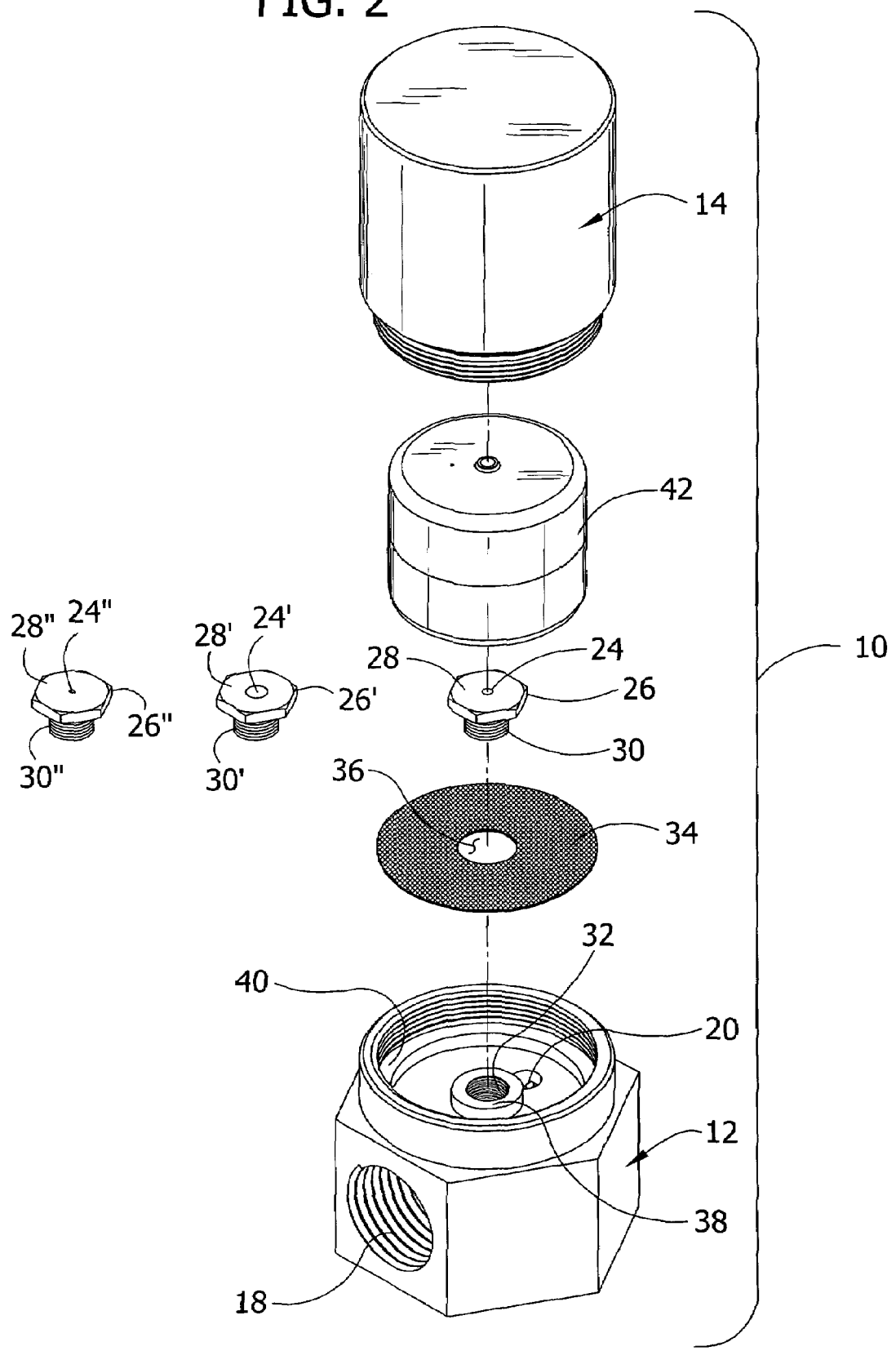
FIG. 2 is an exploded perspective of the condensate drain shown in FIG. 1.

As shown in FIGS. 1 and 2, the drain 10 includes a generally tubular body comprising a hexagonal base, indicated generally at 12, and a cylindrical cap, indicated generally at 14, having a threaded connection to the base. As a result of the threaded connection, the cap 14 can be removed from the base 12 by unscrewing the cap, and can be reconnected by screwing the cap back onto the base. Other structure for releasably connecting the cap to the base may be used without departing from the scope of the present invention. In the illustrated embodiment, the base 12 and cap 1 form a body of the drain. The drain 10 is adapted for installation in the steam system at a location where condensate is desired to be removed, such as at one of several low elevation points in the system or ahead of a flow control valve.

Figure 3:
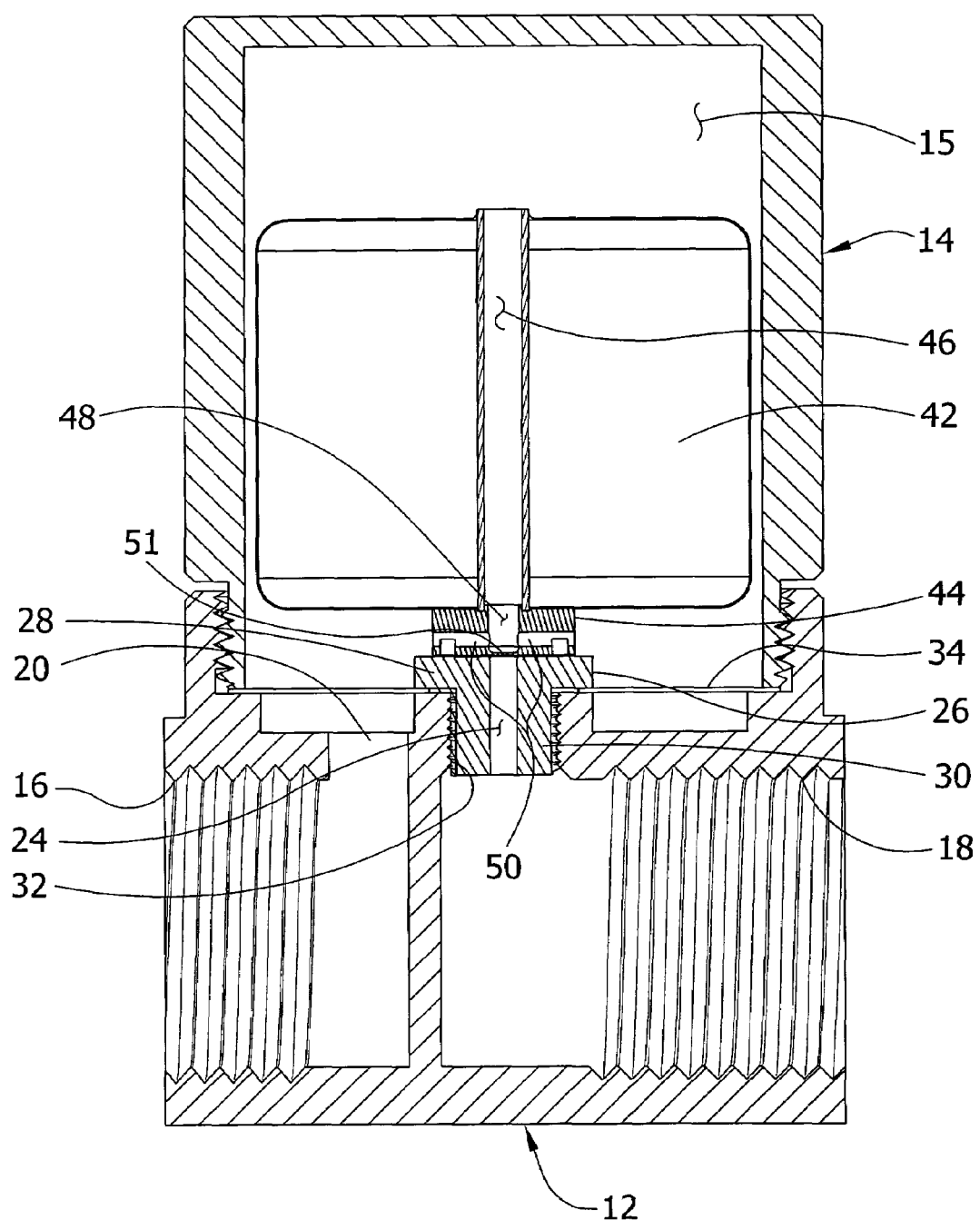
FIG. 3 is a section taken on line 3-3 of FIG. 1.
Figure 4:
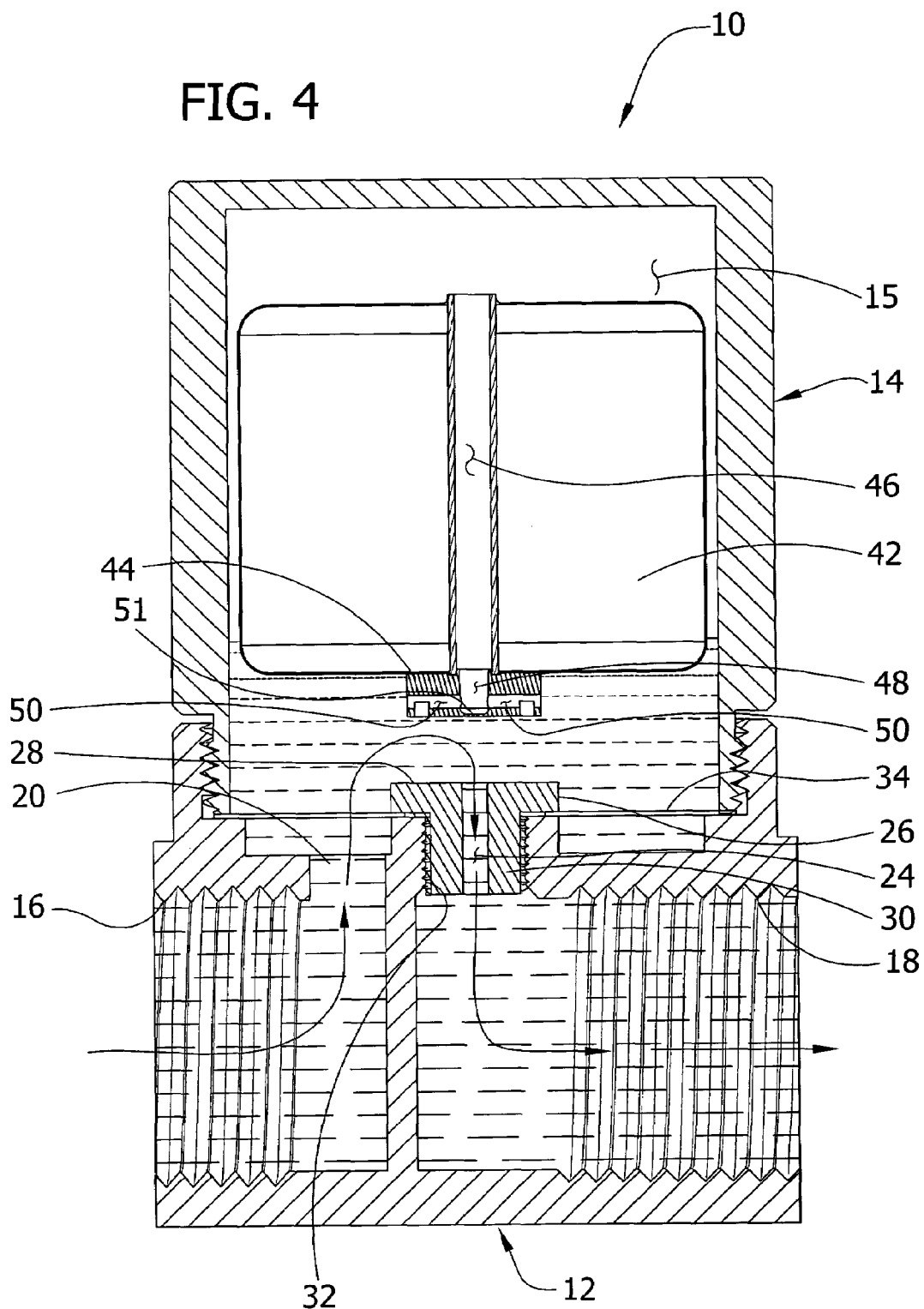
FIG. 4 is a section similar to FIG. 3 with a float moved to an opened position.

The drain 10, as illustrated in FIG. 1, is configured to be installed in the steam system with a longitudinal axis LA of the body of the drain 10 oriented generally vertically so that the cap 14 is positioned above the base 12. As shown in FIG. 3, the base 12 includes an internally threaded entry passage 16 and an internally threaded exit passage 18. The entry passage 16 is used to connect the drain 10 to pipes of the steam system (not shown), and the exit passage 18 is used to connect the drain 10 to a condensate return pipe (not shown). The base 12 also includes an inlet opening 20 to provide fluid communication between entry passage 16 and an interior space 15 of the drain 10. Both steam and condensate, as well as noncondensibles, can enter the inlet opening 20. The interior space 15 of the drain 10 is defined by the base 12 and the cap 14. It will be understood that the number of components defining the interior space 15 may be other than two within the scope of the present invention. Thus, the interior space 15 of the drain 10 is easily assessable by unscrewing the cap 14 from the base 12. Accordingly, the interior space 15 of the drain 10 can be accessed without disassembling any of the piping of the steam system The base 12 further includes an outlet opening 24 that functions as an exit from the interior space 15 of the drain 10 for condensate that is removed from the steam system (FIG. 4). In other words, the outlet opening 24 provides a fluid passage between the interior space 15 of the drain 10 and the exit passage 18. As a result, condensate that passes through the outlet opening 24 to the exit passage 18 flows into the return pipe which in turn delivers condensate to a suitable discharge location, such as a boiler where the water may be re-used. Condensate entering the drain 10 flows from left to right (as viewed) through the drain as indicated by arrows in FIG. 4. Steam is prevented from exiting the interior space 15 of the drain as described in more detail below.

Referring to FIG. 2, the outlet opening 24 is formed in a flow regulator 26 having a seat 28 and a narrower threaded shaft 30 extending outward from the seat. As shown in FIGS. 3 and 4, the threaded shaft 30 is threadedly connected to an internally threaded socket 32 formed in the base 12. Thus, the flow regulator 26 can be readily and nondestructively removed from the base 12 by unscrewing the regulator from the base and can be reconnected by screwing the regulator into the base. In that regard, the seat 28 has the shape of a hexagonal bolt head for facilitating driving engagement by a socket wrench or the like.

As a result, the flow regulator 26 can be easily removed for maintenance (i.e., cleaning) or replaced with a regulator having a different size outlet opening. Thus, the flow capacity of the outlet opening 24 can be selectively altered by replacing the flow regulator 26 with a different flow regulator having a larger or a smaller outlet opening to match the condensate production of the system or region of the system. Accordingly, if the flow capacity of the outlet opening needs to be increased, the flow regulator 26 is replaced with a flow regulator having a larger opening. As illustrated in FIG. 2, for example, a flow regulator 26' similar to flow regulator 26 but having a larger outlet opening 24' can be used to increase the flow capacity of the outlet opening. On the other hand, if the flow capacity of the outlet opening needs to be decreased the flow regulator is replaced with a flow regulator having a smaller opening, such as a flow regulator 26" shown in FIG. 2 that has a smaller outlet opening 24" than the previously described flow regulators 26, 26'. It is understood that flow regulators having openings different than those illustrated can be used.

A mesh screen 34 is disposed within the base 12 for filtering any particles (e.g., pieces of rust) that could lodge in the drain 10 and clog its operation. The screen 34 is interposed between the inlet opening 20 and the outlet opening 24 so that any condensate entering the drain 10 is filtered before it enters into the interior space 15 of the drain. As shown in FIG. 2, the mesh screen 34 is generally annular and has a central aperture 36. The screen 34 is support in the base 12 by two, spaced apart annular ledges 38, 40 formed in the base. The first annular ledge 38 is located adjacent the socket 32 formed in the base 12. The aperture 36 in the screen aligns with the socket 32 for allowing the shaft 30 of the flow regulator 26 to extend through the aperture and be threaded engagement with the socket. An outer edge of the screen 34 is support by second annular ledge 40 spaced from the first annular ledge 38. The seat 28 of the flow regulator 26 clamps the screen 34 against the first annular ledge 38 to hold the screen 34 in place. The screen 34 can be removed for cleaning or replacement by removing the cap 14 and unscrewing the flow regulator 26 from the base socket 32. Once the flow regulator 26 is removed, the screen 34 can be lifted out of the base 12.

The screen 34 in the illustrated configuration comprises a thirty mesh stainless steel wire cloth. But it is understood that the screen could be formed from other materials besides stainless steel or have other mesh sizes (e.g., 40 mesh). Particularly, it is understood that the screen 34 can be readily changed and/or replaced as warranted by the steam system. In other words, the screen 34 is selected from a group of screens to match the specific criteria of the steam system.

Referring now to FIGS. 2-4, a float 42 is disposed in the interior space 15 of the drain 10 for movement between a closed position in which the float blocks fluid communication from the inlet opening 20 to the outlet opening 24 (FIG. 3), and an open position in which the float permits fluid communication from the inlet opening to the outlet opening (FIG. 4). The float 42 is free of any fixed connection to the base 12 or cap 14. The float 42 includes an engagement portion 44 adapted for engagement with the seat 28 of the flow regulator 26 to block fluid communication between the interior space 15 of the drain 10 and the outlet opening 24. The seat 28 of the flow regulator 26 has a width that is substantially larger than the width of the engagement portion 44. As a result, the float 42 can move radially with respect to the longitudinal axis LA of the drain 10 and the engagement portion 44 will still contact the seat 28. The float 42 is buoyant so that as condensate fills the interior space 15 of the drain the float rises (FIG. 4). As a result, the engagement portion 44 is raised off of the seat 28 of the flow regulator 26. In other words, the float 42 is moved to the open position. Once in the open position, condensate exits the interior space 15 of the drain 10 through the outlet opening 24 to the exit passage 18. As the condensate level in the interior space 15 of the drain 10 is lowered by condensate flowing out of the outlet opening 24, the float 42 lowers until the engagement portion 44 reengages with the seat 28 of the flow regulator 26 (FIG. 2). Thus, the float 42 resumes the closed position blocking condensate and/or steam from exiting the interior space 15 of the drain 10. Referring again to FIG. 3 and 4, the portion of the interior space 15 of the drain 10 defined by the cap 14 is sized and shaped for supporting the float 42 from canting with respect to the cap as the float moves between the opened and closed positions. Stated another way, the cap 14 and float 42 are sized and arranged so that the cap constrains the float to move substantially along the longitudinal axis LA. The float 42 is maintained in this orientation so that it cannot rotate about an axis perpendicular to the axis LA so that only the engagement portion 44 ever engages the seat 28 in the closed position of the float.

The engagement portion 44 extends axially outwardly from the float 42 and provides a portion of the float adapted for striking the seat 28 of the flow regulator 26. The engagement portion 44 is robust so that it can withstand the harsh environment to which it is subjected. For example, one suitable material for both the seat 28 and the engagement portion 44 is hardened stainless steel, such as 300 series stainless steels (e.g., 303, 304, 316). In many steam systems, the float 42 is subjected to high pressure differentials that results in the float slamming against the seat 28 or other internal component of the drain. The engagement portion 44 of the present drain 10 is robust enough to withstand being repeatedly, forcefully struck against the seat 28 of the flow regulator 26 or other component of the drain.

Still referring to FIGS. 3 and 4, the float 42 also includes a central passage 46 that extends completely through the center of the float. Accordingly, condensate that forms above the float 42 can flow downward through the central passage 46 to the outlet opening 24 even when the float is in its closed position. The engagement portion 44 of the float 42 has a central orifice 48 in fluid communication with the central passage 46 in the float and lateral orifices 50 in connection with the central orifice. The lateral orifices 50 and central passage 46 are in fluid communication with a small diameter bleed port 51 to provide for a bleed flow of condensate out the drain 10 when the float 42 is closed. Because of the pressure drop of fluid passing out of the central passage 48 to the outlet opening 24, the lateral orifices 50 and central passage 48 are generally filled with water that blocks escape of steam.

The drain 10 of the present invention is constructed of a material suitable for installation in high pressure and temperature steam systems. In practice, stainless steel has been effectively used in constructing each component of the drain. However, elements made of other materials do not depart from the scope of this invention.

Figure 5A:
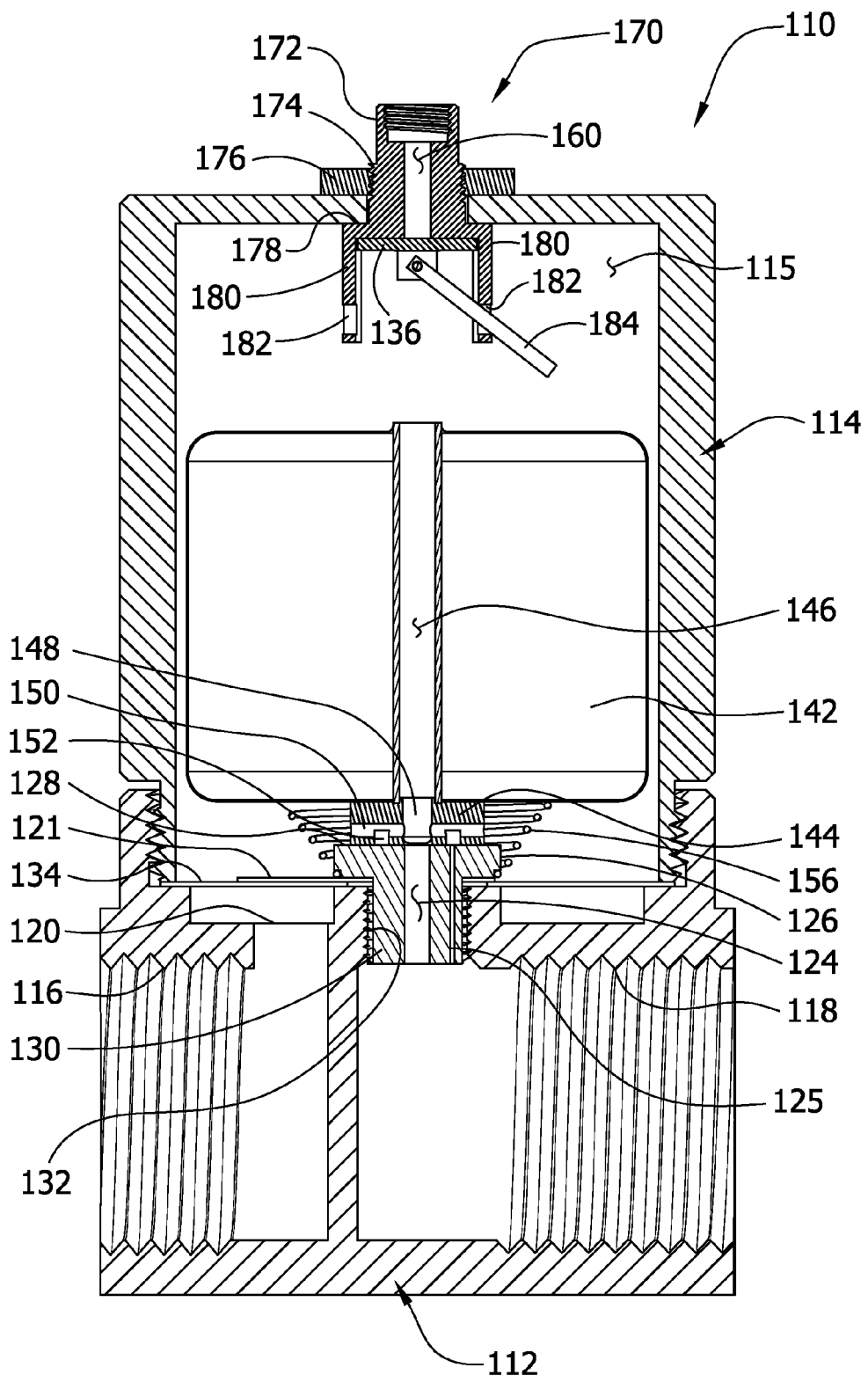
FIG. 5A is a vertical section of a condensate drain having another configuration.
Figure 5B:
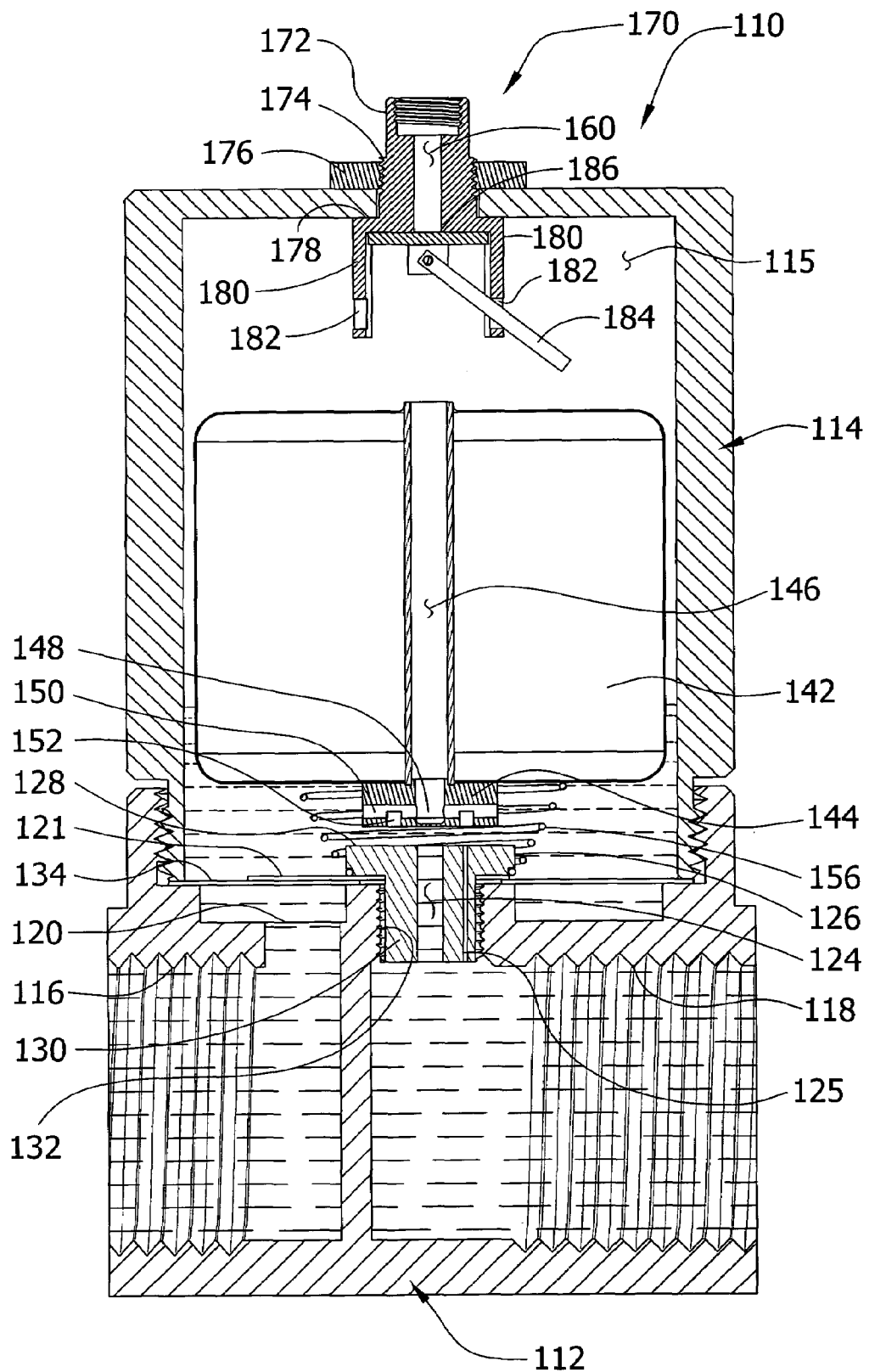
FIG. 5B is a vertical section similar to FIG. 5A with a float moved to an opened position.
Figure 5C:
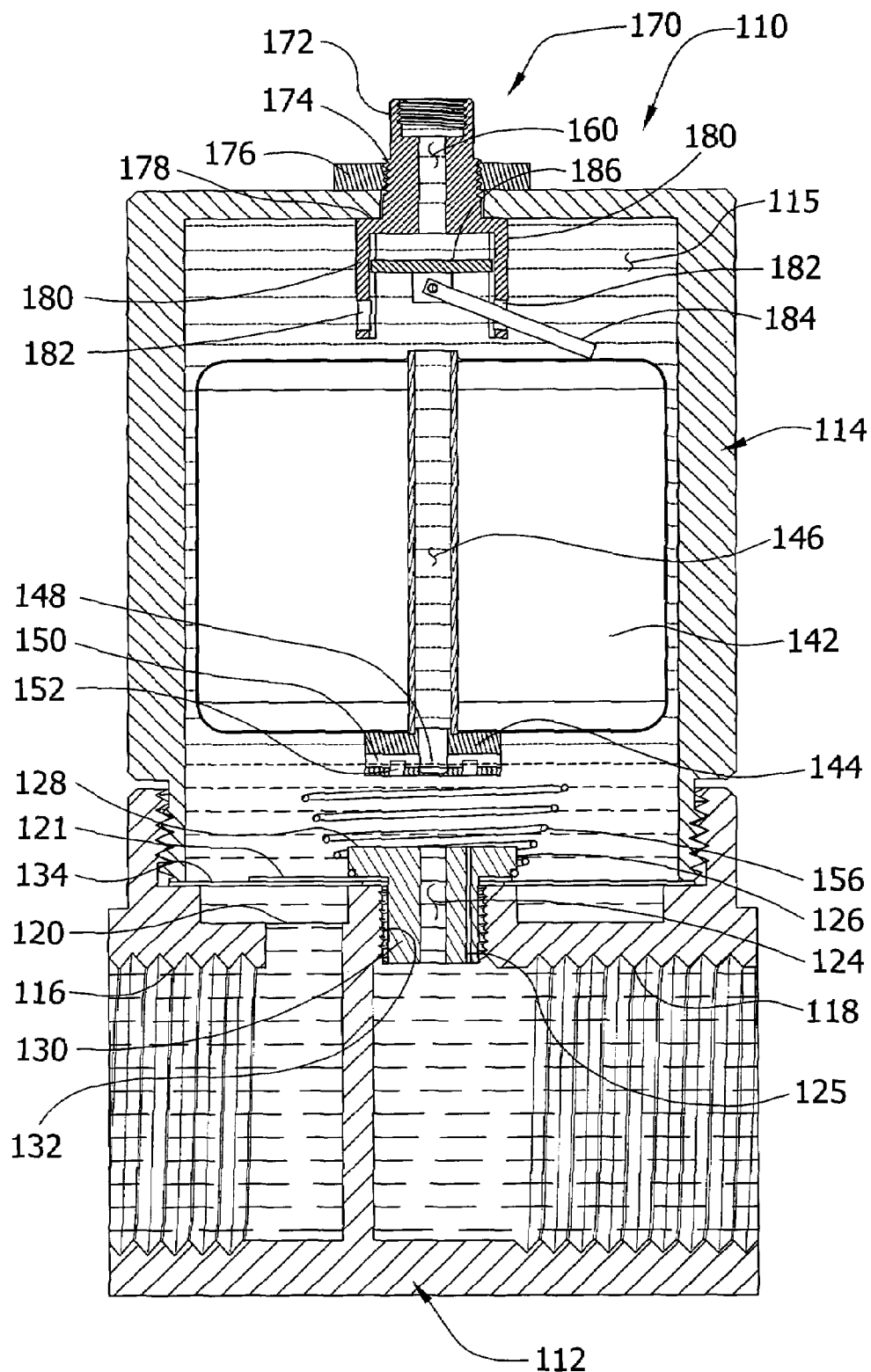
FIG. 5C is a vertical section similar to FIG. 5A with a float moved to an overflow opened position.

FIGS. 5A-5C show a condensate drain 110 similar to the condensate drain 10 shown in FIGS. 1-4. Components of the drain 110 corresponding to the components of the drain 10 will be given the same reference numeral, plus "100". The drain 110, like the previous described drain 10, includes a hexagonal base 112 and a cylindrical cap 114 threadedly connected to the base. The base 112 and cap 114 cooperate to define an interior space 115 of the drain 110. Internally threaded entry passage 116 and exit passage 118 in the base 112 can be used to connect the drain 110 to pipes of a steam system and a return pipe, respectively. The base 112 also includes an inlet opening 120 for providing fluid communication between the steam pipes connected to the entry passage 116 and the interior space 115 of the drain 110. A mesh screen 134 is positioned adjacent the inlet opening 120 so that any condensate entering the drain 110 is filtered before it enters into the interior space 115 of the drain. The mesh screen 134 is support in the base 112 in the same manner as described for screen 34 of drain 10.

The base 112 further includes an outlet opening 124 and bleed opening 125 that function as exits from the interior space 115 of the drain 110 for condensate. In the illustrated configuration, the outlet opening 124 has a larger diameter than the bleed opening 125. Both the outlet and bleed openings 124, 125 are formed in a flow regulator 126 having a seat 128 and a threaded shaft 130 extending outward from the seat for threadedly connecting to the socket 132 formed in the base 112. Thus, the flow regulator 126 can be easily removed for maintenance (i.e., cleaning) or replaced with a regulator having different size openings or more or fewer openings. Thus, the flow capacity through the flow regulator 126 can be selectively altered by replacing the flow regulator 126.

A float 142 with an engagement portion 144 and a central passage 146 is disposed free of fixed connection to the drain 110 in the interior space 115 of the drain 110 for movement between a closed position in which the float blocks fluid communication from the inlet opening 120 to the outlet opening 124 (FIG. 5A), and an open position in which the float permits fluid communication from the inlet opening to the outlet opening (FIGS. 5B and 5C). The float 142 is substantially the same as the float 42 described above and therefore is not described in detail. In this configuration, however, a coil spring 156 biases the float 142 toward the open position so that when the steam system is started any air or other non-condensibles within the system can exit through the outlet opening 124. The pressure of the steam within the system is sufficient to overcome the spring 156 bias and move the float 142 to the closed position thereby inhibiting steam from exiting the drain 110.

Moreover, the engagement portion 144 includes an annular channel 152 for allowing fluid communication between lateral orifices 150 and a central orifice 148 and the bleed opening 125. The annular channel 152 is in continuous fluid communication with the bleed opening 125. This arrangement works well in systems that produce, at least in certain periods of operation, a relatively constant condensate load by allowing condensate to exit the interior space 115 of the drain 110 without movement of the float 142.

As shown in FIGS. 5A-5C and 7, the drain 110 further includes a baffle 121 located adjacent the inlet opening 120 for reducing the force at which condensate enters the interior space 115 of the drain 110. The baffle 121 minimizes damage to the drain 110 (and in particular to the float 142) caused by the high pressures under which some steam systems operate. In some systems, slugs of condensate forcefully enter the interior space 115 of the drain 110 subjecting the drain components to severe stresses that could result in damage. The baffle 121 absorbs the impact and laterally deflects the condensate as it enters into the interior space 115 of the drain 100 thereby preventing the drain components from being damaged.

In the illustrated configuration, the baffle 121 is a rectangular shaped plate that extends over and is shaped above the inlet opening 120. As a result, any condensate entering the interior space 115 of the drain 110 has to flow around the baffle 121. The baffle 121 includes an aperture 123 sized and shaped for aligning with the socket 132 in the base 112. The baffle 121 rests on a screen 134 and is secured in the base 112 by the flow regulator 126. The baffle 121 can be removed by unscrewing the flow regulator 126 from the socket 132. Thus, the baffle 121 can be added or removed from the drain 110 after the drain has been installed in the steam system.

Figure 6:
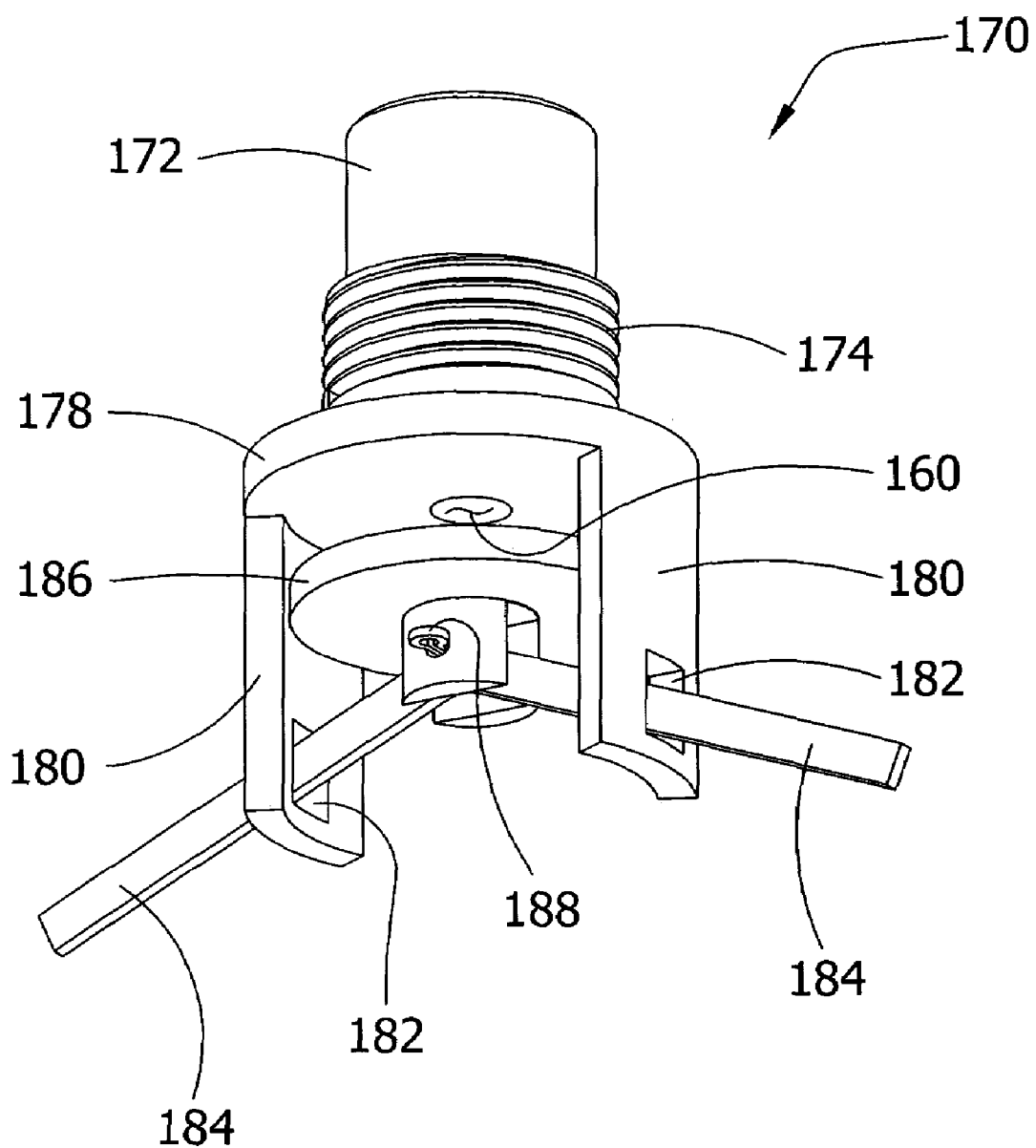
FIG. 6 is an enlarged perspective of a valve shown in FIG. 5.

With reference to FIGS. 5A-6, the drain 110 also includes an overflow opening 160 (broadly, "a second outlet opening") located in a top of the cap 114. The overflow opening 160 provides an overflow in the event condensate comes in more rapidly than can be drained through the outlet opening 124 and the interior space 115 is filled with condensate. A valve, referred to generally at 170, is mounted in the top of the cap 114 to normally block flow through the overflow opening 160. The valve 170 includes a tube 172 with external threads 174 for receiving a nut 176 for securing the valve to the cap 114. The nut 176 tightens against an exterior surface of the cap 114. The valve 170 further includes a shoulder 178 connected to the tube 172. The shoulder 178 engages an interior surface of the cap 114 and cooperates with the nut 176 for mounting the valve 170 to the cap. Extending outwardly from the shoulder 178 is a pair of arms 180 having openings 182. Each of the openings 182 pivotally receives a link 184. The links use the portions of the arms 180 adjacent the openings 182 through which they extend as respective fulcrums for pivoting up and down. A stop 186, which can block fluid communication between the overflow opening 160 and the interior space 115 of the drain 110, is attached to each of the links 184 by pin 188.

As a result, the stop 186 can be moved between a blocking position wherein the stop engages the shoulder 178 and blocks fluid communication between the interior space 175 of the drain 110 and the overflow opening 160 (FIGS. 5A and 5B), and a non-blocking position wherein the stop is spaced from the shoulder thereby allowing fluid communication between the interior space of the drain and the overflow opening (FIG. 5C). It will be appreciated that the stop 186 blocks the overflow opening 160 even when the float 142 is in a "normal" open position as shown in FIG. 5B. However in the event condensate fills the interior space 115 of the drain 110, the float 142 rises in the condensate thereby causing a free end of the links 184 to also rise, as shown in FIG. 5C. Raising the free end of links 184 causing the links to pivot about the opening 182 in the arms 180 such that the links assume a more horizontal position. As a result of the pin connection between the links 184 and the stop 186, the stop is moved to its non-blocking position. With the stop 186 in its non-blocking position, condensate can flow out of the interior space 115 of the drain through the overflow opening 160. It is understood that the stop 186 can be moved by the float 142 in different ways than what is illustrated herein. For example, four links, each spaced 90° apart, can be used instead of the two links 184 shown in the illustrated configuration, which are spaced approximately 180° apart. The use of four links would increase the leverage of the links thereby allowing movement of a larger stop, which allows for a larger overflow opening.

The valve 170 and thereby the overflow opening 160 can be installed in the drain 110 by replacing a cap without a valve (e.g., cap 14) with a cap having a valve (e.g., cap 114). Another way to install the valve in the cap is to drill a hole in the cap, slide the tube 172 of the valve through the hole so that the shoulder 178 engages the interior surface of the cap, and use the nut 176 to secure the valve to the cap. Either way, the valve can be installed in an existing system without disassembling any pipes in the steam system.

Figure 8A:
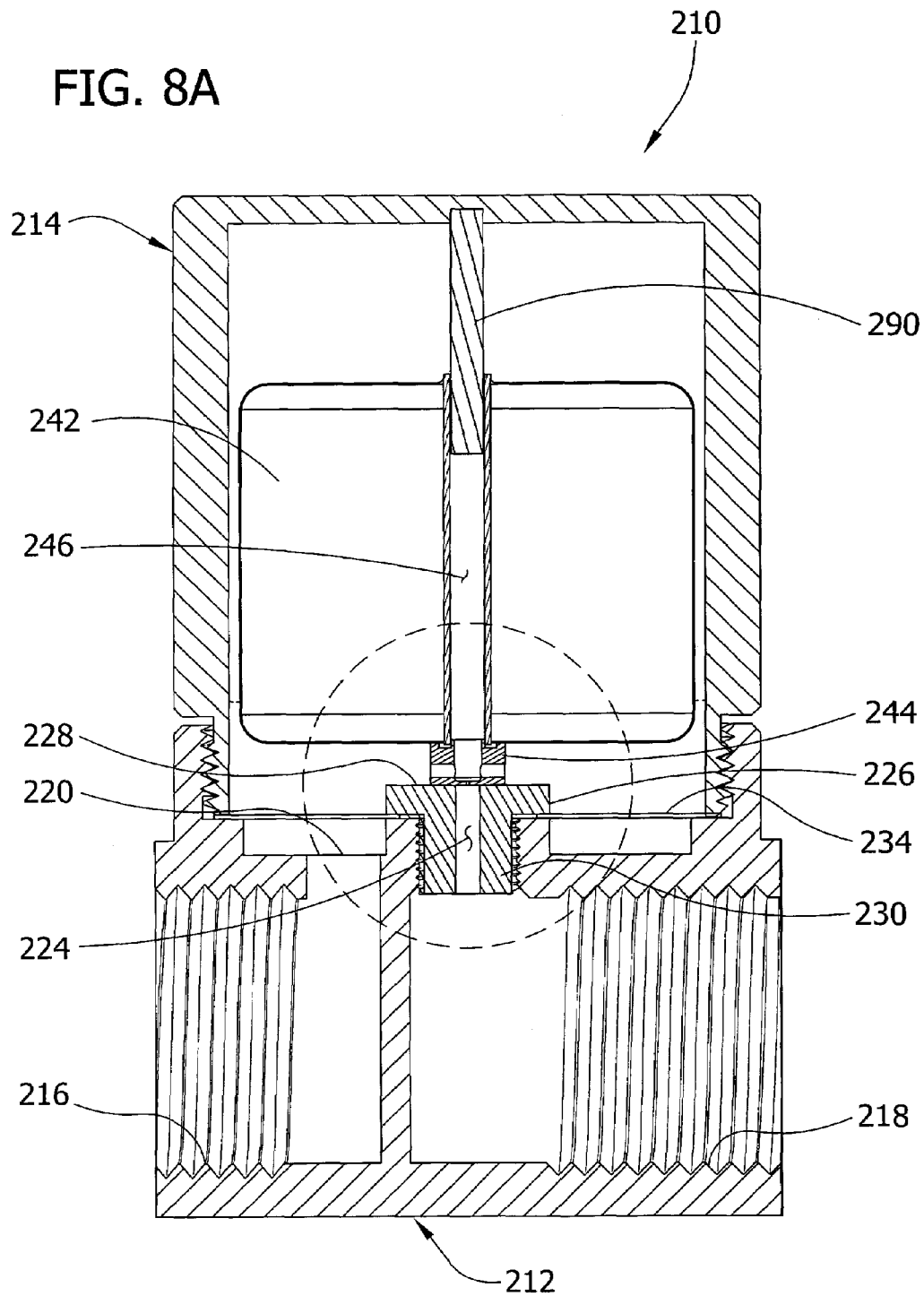
FIG. 8A is a vertical section of a condensate drain having yet another configuration including a guide pin.
Figure 8B:
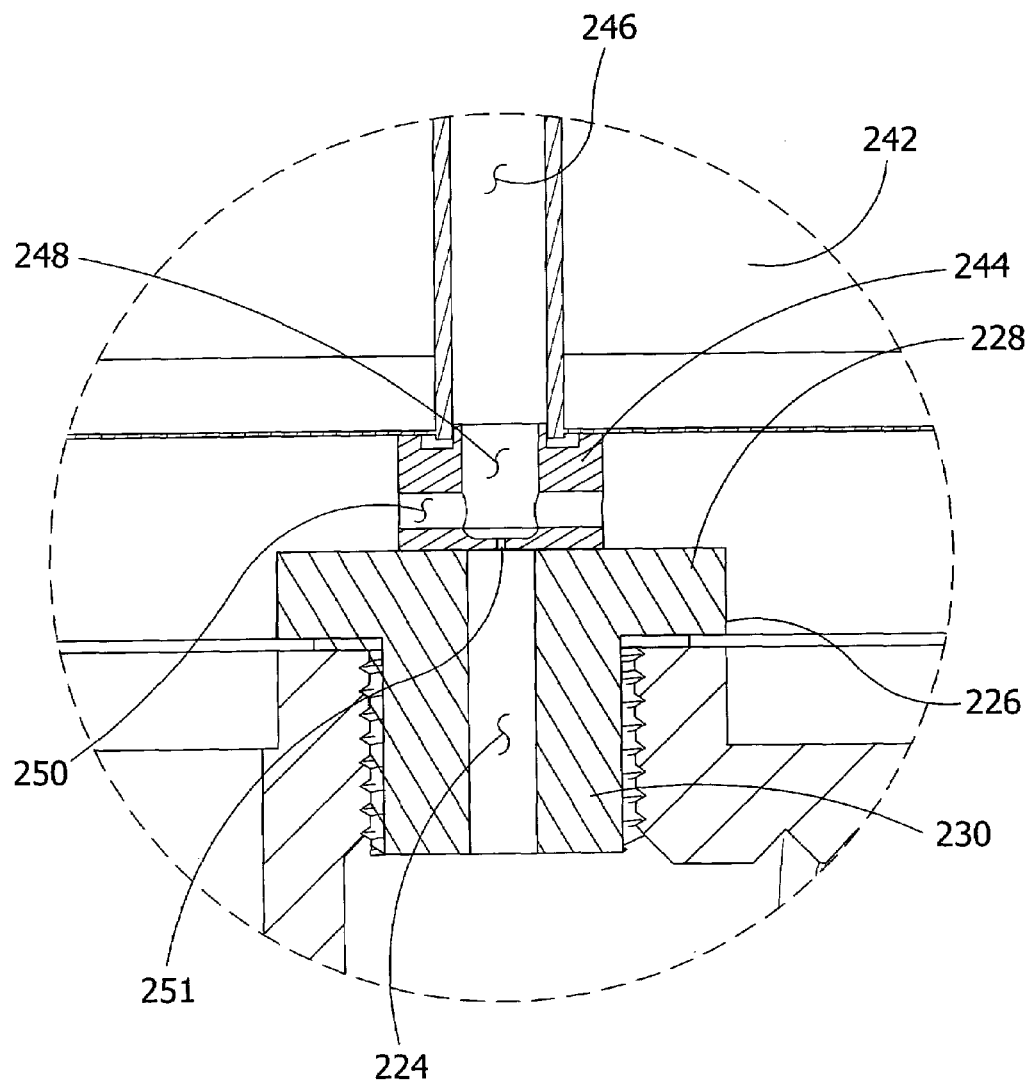
FIG. 8B is an enlarged fragment indicated on FIG. 8.
Figure 8C:
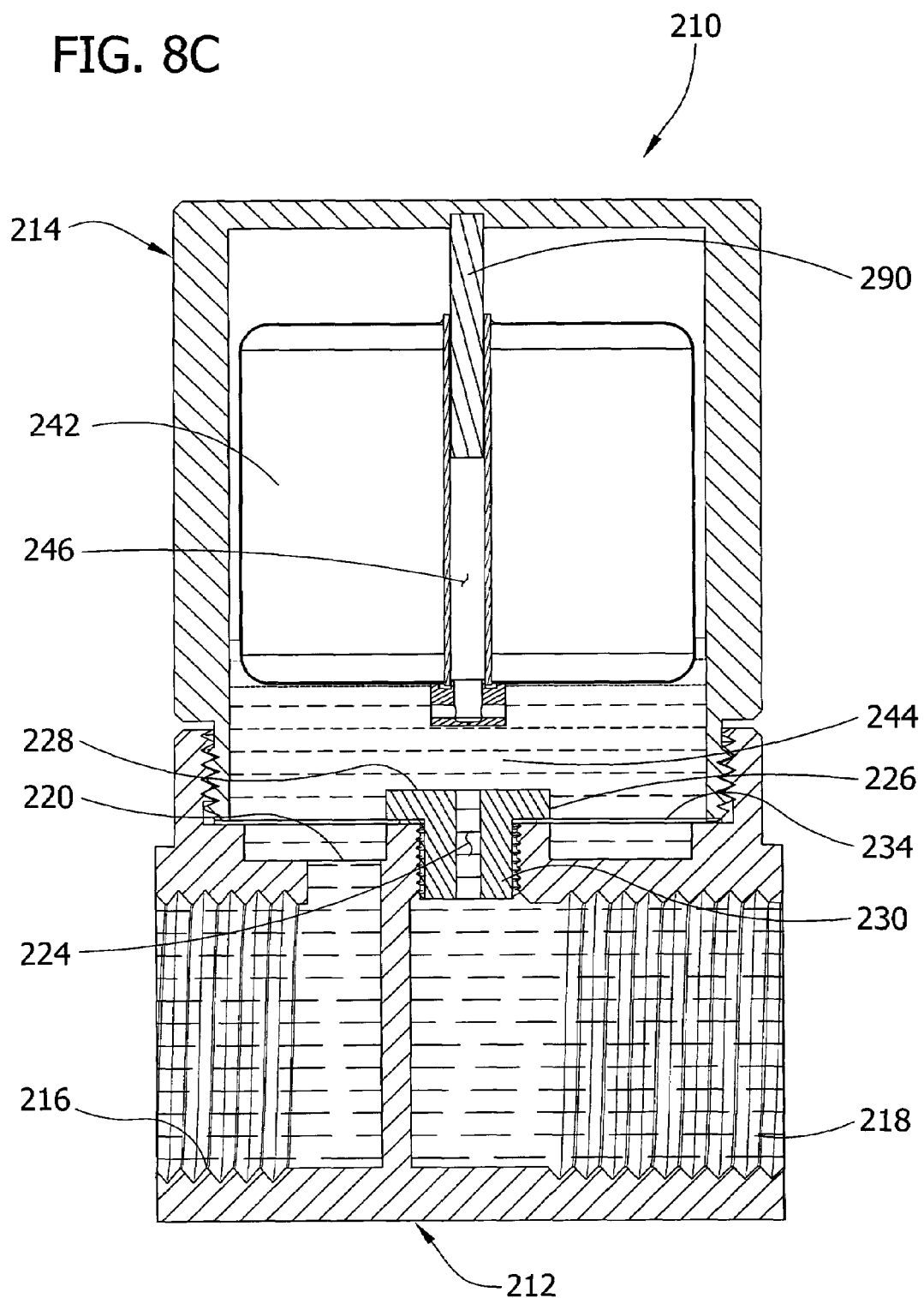
FIG. 8C is a vertical section similar to FIG. 8A with a float moved to an opened position.

FIGS. 8-8C show a drain 210 having yet another configuration. This drain 210 configuration is substantially similar to the drain 10 of FIGS. 1-4. Parts of the drain 210 corresponding to parts of the drain 10 will be given the same reference numeral, plus "200". In this configuration, however, a guide pin 290 extends downward from an upper, interior surface of a cap 214 and is configured to be received in a central tube 246 in a float 242 for orienting the float, and preventing the float from canting. It is noted that although the pin 290 restrains relative movement of the float 242 with respect to the drain 210, the float remains free of any fixed connection. The guide pin 290 in the illustrated configuration has a generally circular cross-section but it is understood that the guide pin could have other cross-section (e.g., star, square, hexagonal).

Moreover, an engagement portion 244 of the float 242 includes a bleed port 251, which is in continuous fluid communication with an outlet opening 224 (FIG. 8A). The bleed port 251 is provided for systems that produce a relatively constant condensate load. Thus, the condensate can exit an interior space 215 of the drain 210 without movement of the float 242. The bleed port 251 can have various sizes to accommodate various condensate loads. In addition, the float 242 having engagement portion 244 with the bleed port 251 can be replaced with a float 242 having an engagement portion with different size bleed port or no bleed port.

Figure 9B:
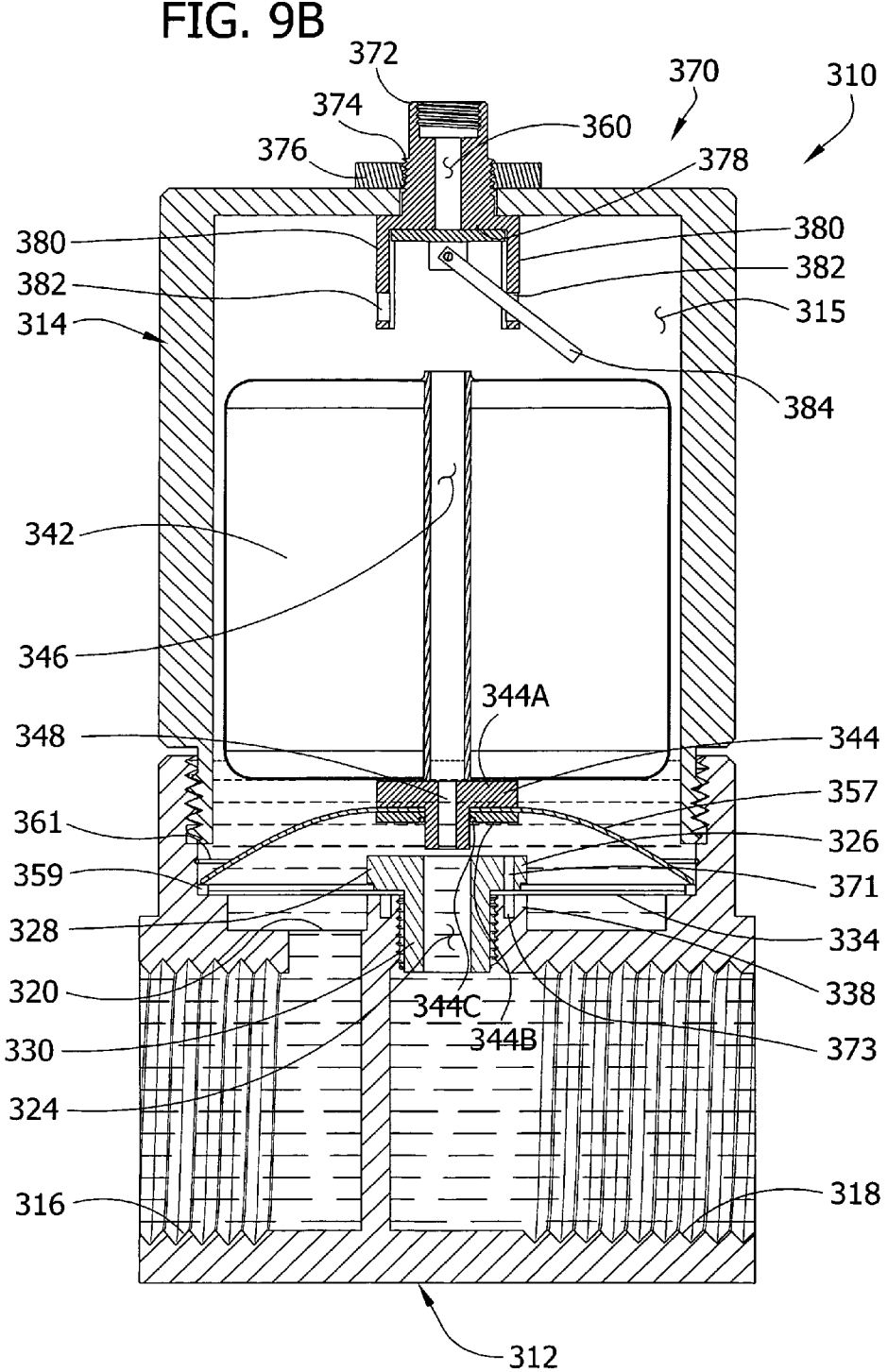
FIG. 9B is a vertical section similar to FIG. 9A with a float moved to an opened position.

FIGS. 9A-10 show a drain 310 having still another configuration that is substantially similar to the drain 110 of FIGS. 5-7. In this configuration, however, a bimetallic disk 357 is used to bias a float 342 toward an open position upon system startup instead of a spring as was shown in FIG. 5. Cooler temperatures cause the bimetallic disk 357 to assume the open position. The pressure within an active steam system is sufficient to overcome biasing force of the bimetallic disk 357 and move the float 342 to the closed position (FIG. 9A). The disk 357 also snaps to the closed position as a result of the effect of the higher temperature of the steam on the disk caused by its bimetallic structure. The bimetallic disk 357 is generally circular with its perimeter edge rests on ribs 359 formed in a base 312 of the drain. A retaining spring 361 cooperates with the ribs 359 for holding the bimetallic disk 357 in place. The bimetallic disk 357 also has a central hole for allowing the bimetallic disk 357 to be captured by an engagement portion 344 of the float 342 so that the bimetallic disk moves up and down as the float 342 moves up and down. In the illustrated configuration, the engagement portion 344 is formed as two pieces secured together. Specifically, the engagement portion 344 comprises a T-shaped member 344A and a washer 344B, which is secured to the T-shaped member using a retaining clip 344C.

Still referring to FIGS. 9A-10, the drain 310 also includes a failure warning system for indicating to the user that the drain has failed. Because of the bimetallic disk 357, failure of the drain 310 will cause the float 342 to be in the open position. The failure warning system includes a passageway 371 through the engagement portion 344. The passageway 371 is opened and closed by the float 342 in the same manner the outlet opening 324 is opened and closed. The passage 371 is in fluid communication with an annular channel 373 that is formed in a ledge 338 in the base 312 (FIG. 9A). A lateral passage 375, as shown in FIG. 10, connects the annular channel 373 to a port 377 on the exterior of the base 312. Because the drain 310 fails open, steam will flow through the passage 371 in the engagement portion 344, through the annular channel 373 and the lateral passage 375 and out the port 377 on the exterior of the base 312. As a result, when the drain 310 fails a user will be able to observe steam outside of the drain. Most commonly, this embodiment would be used in a steam system located outside, such as is common at petrochemical facilities.

As can be appreciated, a drain can be configured using any of the modular components described above to best suit a specific steam system. Thus, combinations of components other than those illustrated in the drawings can be used within the scope of the present invention. In addition, an operator of a steam system may choose to alter a drain of the present invention after it has already been installed in a steam system by using one or more of the modular components to better suit the drain for the flow conditions of the steam system. For instance, when flow conditions change or if the conditions were incorrectly estimated, the operator may quickly change one or more of the drain components to better suit the drain for the condensate load produced by the steam system. Thus, the present invention reduces maintenance time. It also permits a reduction in inventory, since there is no need to maintain a variety of complete condensate removal devices in stock but only to maintain a variety drain components.

When maintenance is required, as to clean the trap or remove a clog, the cap may be easily removed from the base and the device repaired as needed while the base stays threaded in-line. The mesh screen may be cleaned by directing fluid toward the screen to dissolve accumulated deposits. Maintenance time is reduced because there is no need to break the pipe line to service the device.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above described drain without departing from the scope of the invention, it is intended that all matter contained in the above description and shown in the accompanying drawings shall be interpreted as illustrative and not in a limiting sense.

What is claimed is:
1. A condensate drain comprising:
   a body defining an interior space;
   an inlet opening in fluid communication with the interior space of the body for allowing condensate to enter into the interior space;
   an outlet opening in fluid communication with the interior space of the body for allowing condensate to exit the interior space; and a float having a top, a bottom and being disposed in the interior space for movement within the interior space relative to the body generally along a float axis between a closed position in which the float at least partially blocks fluid communication from the inlet opening to the outlet opening and an open position in which the float does not block fluid communication from the inlet opening to the outlet opening, the float being buoyant so that the float is moved to the open position by condensate as condensate fills the interior space of the body, the float including a passage extending from an aperture opening into the interior space of the body in the closed position to a bleed port in communication with the outlet opening in the closed position to permit fluid communication between the interior space of the body and the outlet opening in the closed position of the float, the passage being free of any valve throughout its length;

the float further comprising an engagement portion located at the bottom of the float and covering the outlet opening in the closed position, the engagement portion having the bleed port therein and comprising an orifice arranged to open into the interior space of the body in the closed position at a location spaced from where the float passage opens into the interior space of the body, the orifice, bleed port and float passage opening into each other for fluid communication.

2. A condensate drain as set forth in claim 1 wherein at least a portion of the interior space of the body has a generally cylindrical shape and the float is generally cylindrical, the cylindrical float being received in the cylindrical shaped interior space of the body in closely spaced relation with the body.

3. A condensate drain as set forth in claim 1 further comprising a seat disposed generally at the outlet, the interior space of the body and float being sized and shaped for guiding the engagement portion into engagement with the seat in a position in which the engagement portion at least partially closes the outlet.

4. A condensate drain as set forth in claim 3 wherein the engagement portion is made out of a harder material than the remainder of the float.

5. A condensate drain as set forth in claim 4 wherein the body comprises a base and a cap adapted for releasable connection to the base.

6. A condensate drain as set forth in claim 5 wherein the seat is removably attached to the base and defines the outlet opening.

7. A condensate drain as set forth in claim 1 further comprising a biasing member engaging the float for biasing the float toward the open position.

8. A condensate drain as set forth in claim 7 wherein the biasing member is a spring.

9. A condensate drain as set forth in claim 1 further comprising a baffle for directing condensate laterally within the interior space of the body as it enters the body through the inlet opening.

10. A condensate drain as set forth in claim 9 wherein the baffle is removably mounted in the body.

11. A condensate drain as set forth in claim 1 wherein the outlet and inlet openings each face in a direction along the float axis.

12. A condensate drain as set forth in claim 11 wherein the inlet opening is in opposing relation with the float.

\* \* \* \* \*